(12) United States Patent
Mumm et al.

(10) Patent No.: US 8,321,684 B2
(45) Date of Patent: Nov. 27, 2012

(54) DIGITAL PROCESS AND ARRANGEMENT FOR AUTHENTICATING A USER OF A TELECOMMUNICATIONS OR DATA NETWORK

(75) Inventors: Marc Mumm, Munich (DE); Raja Kuppuswamy, Munich (DE)

(73) Assignee: Voicecash IP GmbH (CH)

( * ) Notice: Subject to any disclaimer, the term of this patent is extended or adjusted under 35 U.S.C. 154(b) by 978 days.

(21) Appl. No.: 11/780,120

(22) Filed: Jul. 19, 2007

(65) Prior Publication Data

US 2008/0192901 A1 Aug. 14, 2008

(30) Foreign Application Priority Data

Feb. 12, 2007 (DE) .................. 10 2007 006 847

(51) Int. Cl.
*H04L 29/06* (2006.01)
(52) U.S. Cl. .................. 713/186; 726/4; 726/5
(58) Field of Classification Search .............. 713/186; 726/2–5

See application file for complete search history.

(56) References Cited

U.S. PATENT DOCUMENTS

| 5,012,519 | A * | 4/1991 | Adlersberg et al. | 704/226 |
| 6,016,476 | A * | 1/2000 | Maes et al. | 705/18 |
| 7,698,566 | B1 * | 4/2010 | Stone | 713/186 |
| 7,721,109 | B1 * | 5/2010 | Herder | 713/186 |
| 2002/0002590 | A1 * | 1/2002 | King et al. | 709/206 |
| 2002/0178370 | A1 * | 11/2002 | Gurevich et al. | 713/189 |
| 2003/0051138 | A1 | 3/2003 | Maeda | |
| 2003/0112936 | A1 * | 6/2003 | Brown et al. | 379/121.02 |
| 2006/0034287 | A1 | 2/2006 | Novack | |

OTHER PUBLICATIONS

Gao et. al. "P2P-Paid: A Peer-to-Peer Wireless Payment System", 2005, Proceedings of the 2005 Second IEEE International Workshop on Mobile Commerce and Services (WMCS'05), pp. 102-111.*
Vaughan-Nichols, "Voice Authentication Speaks to the Marketplace", Mar. 2004, Computer (magazine), pp. 13-15.*

* cited by examiner

*Primary Examiner* — Kambiz Zand
*Assistant Examiner* — Michael Guirguis
(74) *Attorney, Agent, or Firm* — Donald R. Boys; Central Coast Patent Agency, Inc.

(57) ABSTRACT

Digital process for authentication of a user of a telecommunications or data network for access to protected data or a service reserved for a defined circle of users or for the use of data currently entered by the user, wherein a voice sample currently enunciated during an access attempt by the user on a telecommunications or VoIP terminal device is routed to a voice analysis unit and, herein, a current voice profile is computed and this is compared in a voice profile comparison unit against a previously stored initial voice profile and, in response to a positive comparison result, the user is authenticated and a first control signal enabling access, but in response to a negative comparison result a second control signal disabling access or triggering a substitute authentication procedure is generated.

12 Claims, 6 Drawing Sheets

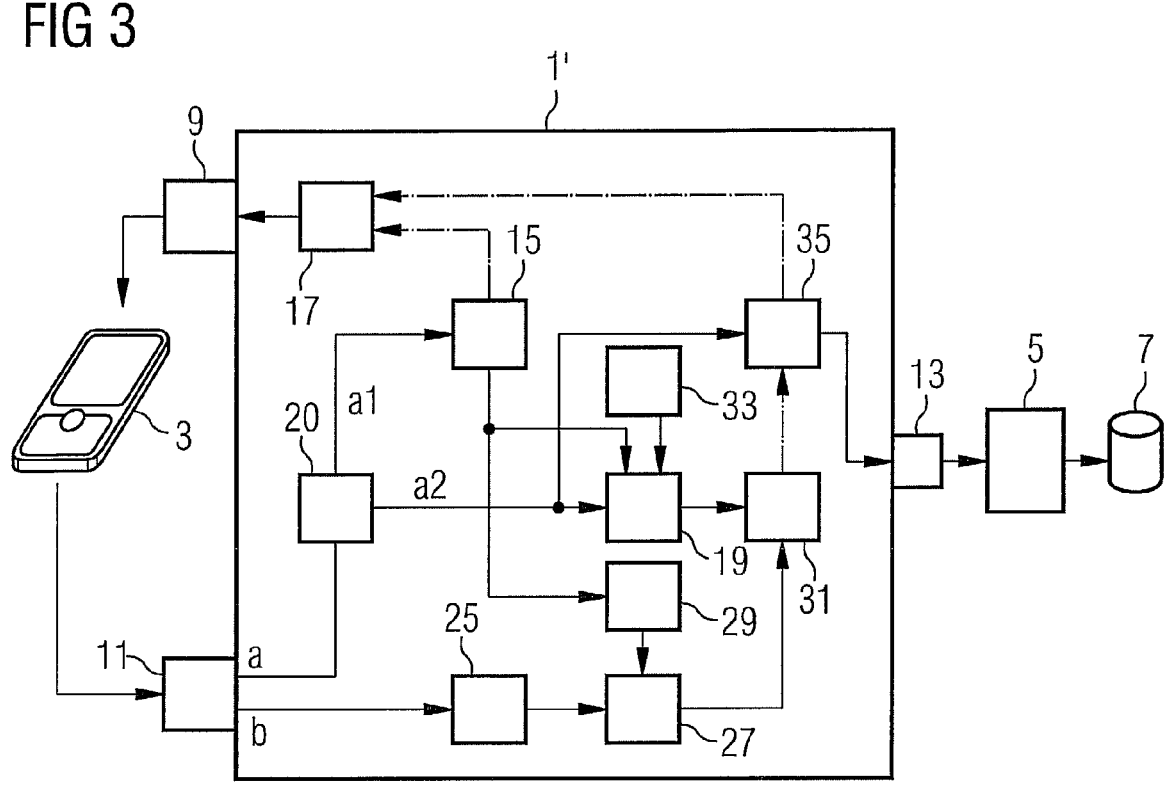

Figure 1:
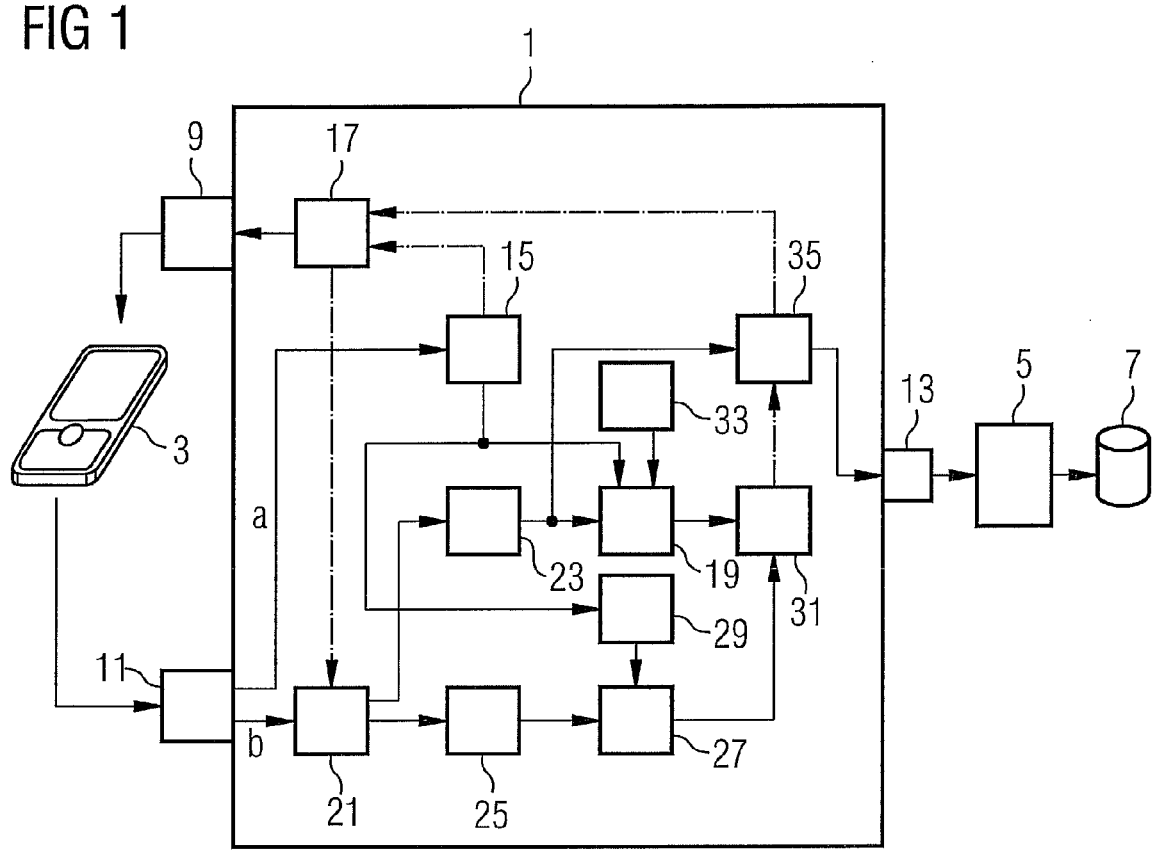

DIGITAL PROCESS AND ARRANGEMENT FOR AUTHENTICATING A USER OF A TELECOMMUNICATIONS OR DATA NETWORK

The invention refers to a digital process for authenticating a user of a telecommunications or data network and an arrangement for realizing this process.

Since it has been possible to operate telecommunications and data terminal devices as mobile devices in the form of mobile phones and portable computers with mobile network or a WLAN interface, for many purposes and in relation to diverse criteria authentication of the actual user has become even more important than before. This is particularly virulent in connection with access to financial resources of an actual or potential user, but also in relation to access to services or protected datasets that are not freely available.

While this problem already led to extensive development endeavors, and also certainly marketable and common market solutions, years ago in the case of PCs, for example with the development of electronic home banking and the creation of Internet trading platforms, apart from the daily use of a PIN to log in, up to now none of the solutions developed has been able to assert itself in the case of mobile terminals. Thus, there are various competing modalities for the mass routine operation of recharging a prepaid card of a mobile telephone, all of which are practicable, but which each present certain disadvantages.

The "classical" variant consists of the prepaid user purchasing (via cash payment, by EC card debiting or also by credit card) a voucher with a given value from his or her provider or an authorised dealer. A hidden code number, which must be revealed by scratching, is specified on the voucher and the user must communicate it by telephone to a call centre of the provider or a voice portal. There, the user's prepaid account is recharged with the amount paid.

In the recent past, various bank-based prepaid card charging processes have established themselves, for example by online transfer of the recharge amount or by direct "recharging" at a cash dispenser using a customer card or an EC card. Recharging via the Internet is possible by using a credit card or a conventional bank account directly via the network provider's, provider's or authorised dealer's homepage. Here also, processes have established themselves in which a voucher code is communicated to the customer which serves to ensure the security of the transaction.

Processes for use of the mobile telephone are known which function by input of a credit card number or a predefined PIN via the mobile telephone's keypad. The first is relatively inconvenient and the latter suffers from the known drawbacks of PIN-based authentication procedures, namely limited security due to unintentional passing on of the PIN or loss of a noted PIN and the inconvenience suffered when a PIN is lost or forgotten. In addition to the PIN-secured processes, recharging processes are now in practical use that allow unprotected access to stored bank or credit card accounts for a caller, in any case for the purpose of recharging a card with a relatively small amount of money.

Apart from the drawbacks already mentioned, some of the known and established methods also entail relatively large amounts of organization for the provider and they are thus costly and, at the consumer end, they can only be accepted to a limited extent due to the need to use a further medium (besides the mobile telephone).

Various processes are also known for access protection of datasets or services that can be requested via a mobile telephone or a mobile PC which processes, however, are reserved for a limited circle of users and which are relatively inconvenient for the user and/or offer limited security.

The invention is based on the object of providing an improved process and an improved arrangement of the aforementioned kind which are distinguished in particular by a combination of user-friendliness (and hence the required user acceptance) and an adequate security standard.

In relation to its process aspect, this problem is solved by a process with the characteristics of Claim 1 and, in relation to its arrangement aspect, by an arrangement with the characteristics of Claim 16. Expedient enhancements of the inventive concept are the subject of dependent claims.

The invention is based on the fundamental idea of using the biometric characteristic of the peculiarity of the voice or of the voice profile, which is especially suitable for telecommunications, as a direct user attribute instead of the previously common fundamental authentication means of possession and knowledge to solve the problem explained above. In a variant of the invention it is intended to also use this special biometric attribute in combination with a knowledge-based authentication by using a password or a code word, etc. The invention furthermore includes the idea of feeding to a voice analysis unit a voice sample supplied by the user within the frame of his or her access attempt and of attempting to define a current voice profile in it.

If this attempt is successful with sufficient reliability due to the quality of the voice sample enunciated, the voice sample will serve to authenticate the user and, if the result of authentication is positive, the attempted access will be granted. In the event that authentication should fail due to the voice sample supplied (due to insufficient quality or inadequate reliability of the voice profile evaluation), several options are possible within the scope of the process proposed, wherein the choice of the security level granted will above all depend on further constraints such as defined user prompting conditions. In particular, in this case a substitute authentication procedure will be started, which will use a different means of authentication, for example a password, a PIN etc.

One important application is the one in which a prepaid mobile phone is used as the telecommunications terminal device and access concerns stored transaction data for a payment transaction to fill up a prepaid credit. In this case it is in particular planned, by enabling access, to simultaneously trigger a payment transaction and card recharging on the basis of the stored transaction data. Also beyond the scope of recharging a prepaid card, it is possible to provide for cases in which access concerns data of a bank or credit card account relevant to a transaction.

As an alternative to enabling access to previously stored transaction data, both in the case of the prepaid application and also beyond its scope, it is possible to provide for situations in which transaction data is entered via a telecommunications or VoIP terminal device and its use for triggering a payment transaction is controlled by enabling access. Although this involves more operation effort for the user in each individual case, this may boost acceptance of the process in the case of users who are particularly sensitive to storage of important personal data (such as financial transaction data) in databases.

A further important application is when access concerns an e-mail account or an individualized internet portal. Finally, it is possible to provide for cases in which access concerns a protected memory area where personal documents of the user are stored. These latter mentioned application cases therefore concern access to protected personal data of a user. Finally, as already mentioned above, with the proposed process authentication can also take place for authorised access to services of a service provider that are not freely available.

If, due to particular interference sensitivity of a transmission channel, it appears necessary to remove interference from the voice material to be processed in the voice analysis, channel-adapted digital voice sample pre-processing can be realized at the input end of the voice analysis unit to eliminate voice profile interference impressed in the transmission channel between the telecommunications or VoIP terminal device and a voice sample input interface. In particular, filter parameters can be used during voice sample pre-processing that have been determined in advance from channel parameters, in particular codec parameters, of the network standards used by the telecommunications or VoIP terminal device. Such a voice sample pre-processing must—insofar as it is intended at all—in any case be such that no attributes of the voice sample essential to the voice analysis are lost and the frequency and amplitude characteristics and especially pulse attributes are preserved.

In the interests of high user acceptance and also to avoid organizational problems on the part of the provider of a corresponding service, the proposed process is preferably combined, as already mentioned above, with a substitute authentication procedure. To this end, in particular entry of a PIN or of a code word or password or similar and comparison with a previously stored PIN or code word, etc. is provided for. This procedure is based on the consideration that it is paramount, especially in the case of operations with security requirements that are not all that high, to also actually enable access for the user during his or her access attempt. This was specially conceived so that, during a first attempt, an enabling signal is generated in a simplifying way as a response to entry of the PIN or the password, etc. and enunciation of a first voice sample.

To be able to rely, for later access attempts, after a first access, solely on the performance of voice profile authentication, however, the first voice sample is used for an enrolment. Then, the process can be designed so that the user is repeatedly asked to provide a voice sample until a voice profile is actually determined on the basis of one or several of the enunciated voice sample and it has been possible to store it, and only then is access granted to the user. Although this variant may initially lead to irritation on the part of users if computation of the voice profile is not immediately successful with his or her first voice sample, it ensures the availability of an initial voice profile for subsequent authentication events.

Within the scope of the proposed process, it is initially possible to use voice samples chosen by the user for voice analysis, for example the user's own name enunciated by the user or a password, etc. However, a higher probability that the voice sample will be useful for voice profile computation is achieved if voice samples are stipulated to the user that have been assessed in relation to phonematic criteria and have proven themselves. Then, within the scope of user prompting, the or every voice sample to be enunciated is displayed or spoken to the user and he or she is optionally asked to enter a PIN or a code word or similar. Variants of the process according to the invention largely transpire from the process aspects explained above and therefore do not require any further explanation here. It is pointed out, however, that the core of a corresponding arrangement is typically a system server that functionally interacts with external databases and possibly a data management server belonging to them. In particular, it is then planned for the system server to be in a protected connection, during and/or directly after completion of the authentication procedure, with a control input of a data management server on which protected data or documents are stored, or with a control input of a service server through which the services reserved for a defined circle of users can be accessed or generated. Essential components of the system server are a voice sample input interface, a voice analysis unit, a voice profile storage unit, and a voice profile comparison unit connected to both of them.

In a preferred embodiment that enables the realisation of the substitute authentication procedure mentioned above, the system server also includes a password input interface for receipt of a PIN or a code word or password or similar entered by the user on his or her terminal device, a password storage unit for storage of a registered PIN or code word, etc. and a password comparison unit for comparison of a currently entered PIN with a registered one or of a currently entered code word with a registered code word, etc. and for output of the enabling or disabling control signal depending on the comparison result. Here, the user prompting unit for realisation of visual and/or audible user prompting is in particular such that the user is asked for voice samples and can be asked to enter a PIN, a code word, etc. on his or her terminal device.

In one version of the system, which is open for current input of relevant data by the user, the system server has a data input interface for receipt of data entered by the user on his or her terminal device, a data storage unit connected to the data input interface for at least temporary storage of the data received and a data forwarding control unit connected by control signal to the voice profile comparison unit for forwarding of stored data in response to output of the first control signal by the voice profile comparison unit.

Advantages and practicalities of the invention otherwise result from the following description of a preferred variant example with reference to the figures. Of these:

FIG. 1 shows a schematic depiction of a first example of the arrangement according to the invention as a function block diagram, FIG. 2A to 2E show a depiction of the sequence of the process according to the invention in an example in the form of a flowchart (call flow) and FIG. 3 shows a schematic depiction of a second example of the arrangement according to the invention as a function block diagram.

FIG. 1 schematically shows the structure of an embodiment of the arrangement according to the invention, with a system server 1 (which, within the context in relation to its main function, can also be referred to as an authentication server) and the linking element between a mobile radio terminal device 3 of a user and a data management server 5 of a database 7. The data management server 5 is not specified any further below; here, it generally stands for any kind of functionality with which access to data or services managed internally in the system, also in connection with financial transactions, can be enabled for the user of a mobile telephone. With regard to the signal connections shown, the illustration is based on the assumption that the system server is in the authentication mode.

The system server 1 has a user prompting output interface 9, a user input interface 11 (which simultaneously acts as a voice sample input interface) for temporary connection to the mobile telephone 3 of the user and a control signal output interface 13 for connection to the data management server 5 for the output of control signals to the latter.

According to the functional structure (shown in a simplified form in the figure for improved clarity) of the system server 1, the user input interface 11 is simultaneously designed as an input signal branch which permits feeding of input signals (for example the MSISDN) transmitted automatically by the mobile telephone 3 to subsequent processing units over a first signal path a and of voice inputs of the user to subsequent components via a second signal path b. The signal path a leads to a mobile number recognition unit 15 that issues a control signal to a user prompting unit 17 in response to detection of the user's mobile radio telephone number. Unit 17 realizes all user prompting during enrolment or authentication processes executed with the system presented and outputs corresponding elements of user prompting through the user prompting output interface 9. The detected MSISDN is also supplied by the mobile number recognition unit 15 to a user data processing stage 19 which, all in all, is designed for input-end processing of all manner of user data. Therein, user data are initially buffered for later processing.

An internal control signal output in response to receipt of the MSISDN and in parallel with the output of a user prompt that guides users through the further procedure by the user prompting unit 17 is passed on to a voice input switching unit 21, which permits internal processing of voice inputs in the system server 1 made by the user on his or her mobile telephone 3 and routed into the signal path b.

The voice input switching unit 21 forms a signal branching point from where a received voice input is routed on the one hand to a voice recognition unit 23 for evaluation of the content of the voice input and, on the other hand to a voice profile evaluating unit 25. Depending on the specific control state of the voice input switching unit 21, alternative or parallel forwarding of a received voice sample to the alternative or parallel content evaluation of voice analysis is possible.

A voice profile successfully evaluated by the voice profile computing unit 25 is routed to a voice profile comparison unit 27, where it is subjected to a comparison with a previously stored voice profile of the same user, which is loaded for this purpose from voiced profile storage unit 29. Corresponding addressing of the voice profile storage unit 29 is ensured via the output signal of the mobile number recognition unit 15, which supplies the relevant indicator for the user's identity. If conformity transpires from the comparison of the voice profiles in the comparison unit 27 to an adequate degree of reliability, this unit outputs a corresponding confirmation signal to a first input of an OR stage 31.

The voice recognition unit 23 acquires relevant user information from the same or another voice sample (see further below, with reference to FIGS. 2A to 2E) and routes it to the user data processing stage 19. This stage is adapted for comparative processing of user data received in this way of directly from the mobile number recognition unit 15 with the comparison data stored in the user data storage unit 33. It can (besides other functions which have been omitted in the simplified functionality presented here) output a confirmation signal to a second input of the OR stage 31 as a result of the comparison.

Furthermore, user inputs processed by voice recognition in the voice recognition unit 23 (for example, a required access address of a memory portion spoken in plain language, the designation of a service retrieved by the user or a recharging amount for a prepaid card) can be routed to the input of a user input switch-through stage 35. The user input switch-through stage 35 is connected via a control input to the output of the OR stage 31, which stage 31 sets it to a user input switch-through state if a positive confirmation signal is present at least one of its inputs such signal identifying successful authentication of the user via his or her voice profile or via other inputs (i.e. in a substitute authentication procedure). In this case the user input present at the input end is routed into the control signal output interface 13 and finally results in access enabling in the database 7 via the data management server 5 (or to the execution of a comparable operation, for example the provision of a required service or the execution of a required transaction based on transaction data stored in the database 7).

At the same time, a control signal indicating switching through of the user inputs is sent to the user prompting unit 17, which outputs corresponding confirmation information for display/output on the mobile telephone 3.

One of ordinary skill in the art can derive details of the special processes for specific application scenarios easily from the description above, so that an explanation of one single example as given below will suffice. It also transpires from the following description that the voice profile evaluation and voice recognition for the purpose of substitute authentication shown as parallel processing in a simplified form in FIG. 1 can be conditionally combined. Then, the acquisition of a confirmation signal for user access to the database is first attempted on the basis of his or her voice profile and a substitute procedure is only stated if this authentication attempt should fail. Naturally, in such a realisation, the signal combinations between the individual processing units, the user input switch-through stage and the user prompting unit are correspondingly more complex and time-dependent.

FIGS. 2A to 2E show the process sequence or call flow in an application of the process according to the invention during authentication of a caller in the context of recharging a mobile prepaid card by calling the provider. The flowchart is essential self-explanatory, so that an additional description can be dispensed with. This is why, below, only a few basic aspects of this process are pointed out along with relationships/sequences that are not easily apparent from the flowchart.

Figure 2A:
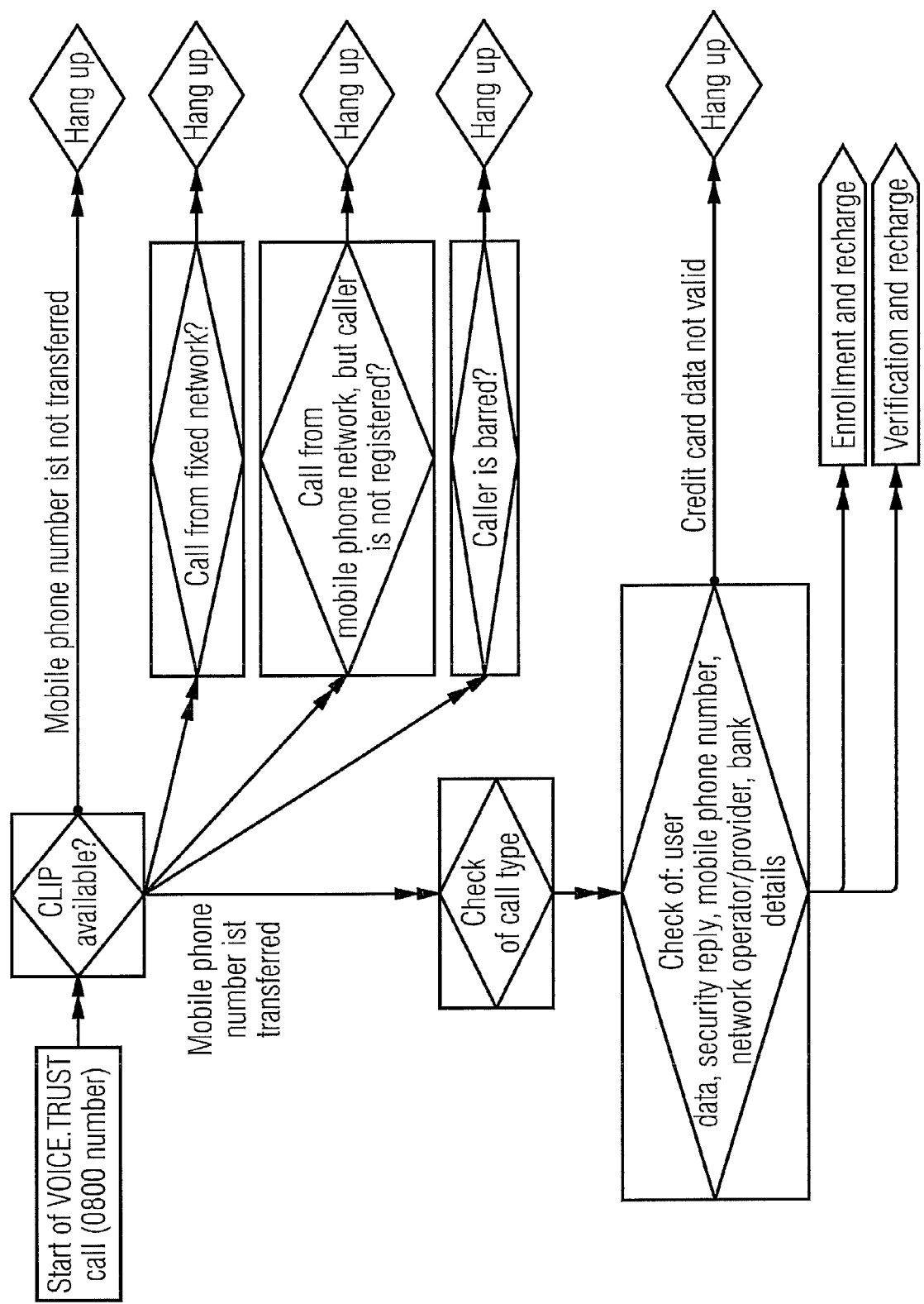

With regard to the part shown in FIG. 2A, it must first be mentioned that the process sequence shown by way of example is based on the fact that the provider has a stored user record containing, among other things, transaction data of a credit card account of the user and a so-called "security answer" (a code word or password). It must also be pointed out that the "hang up" event stands in short for termination of the connection on the part of the provider which, in practice, will certainly be linked with a suitable message for the calling user. It may make sense for this message to refer to the reason for terminating the connection.

Figure 2B:
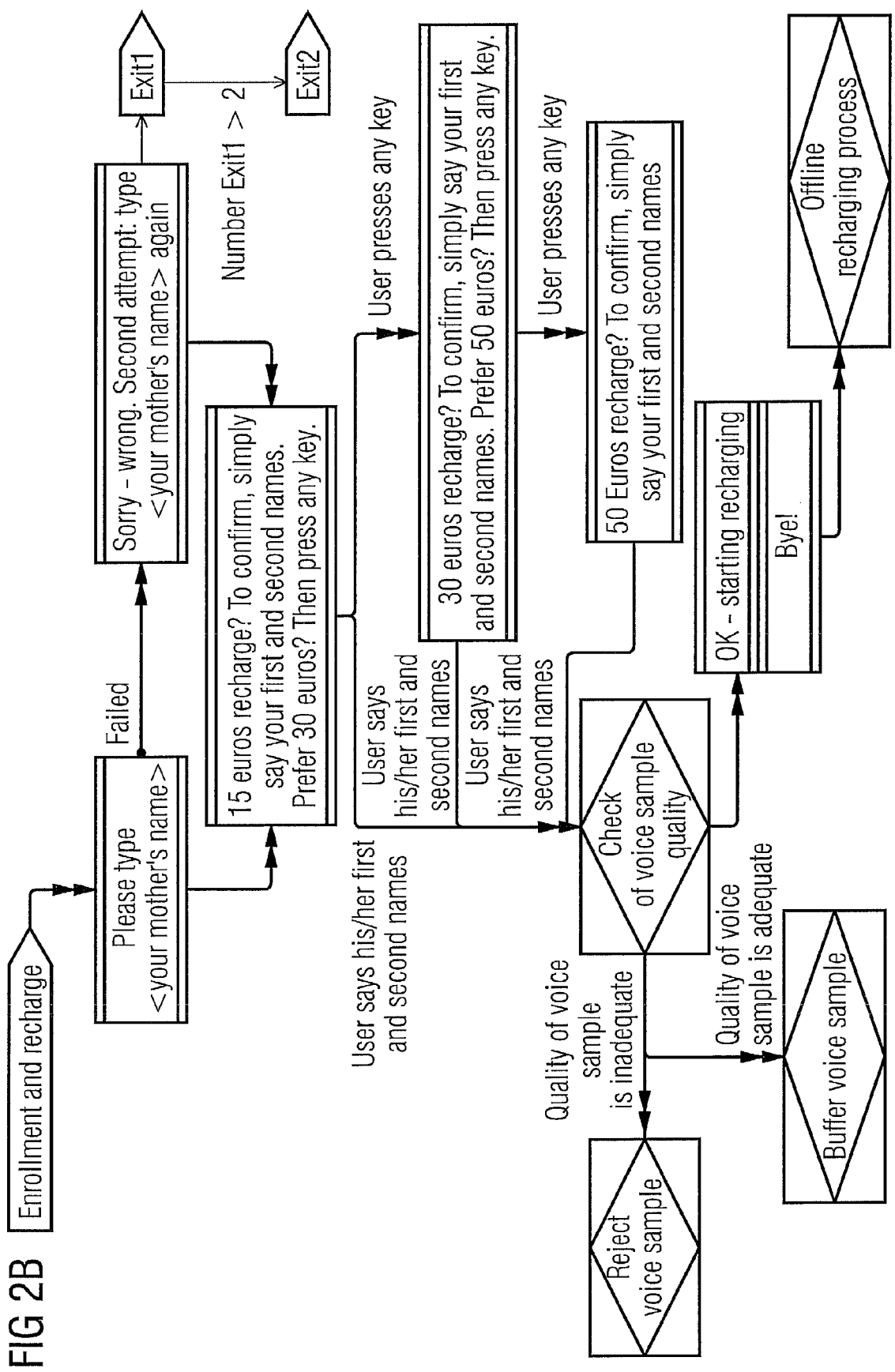
Figure 2C:
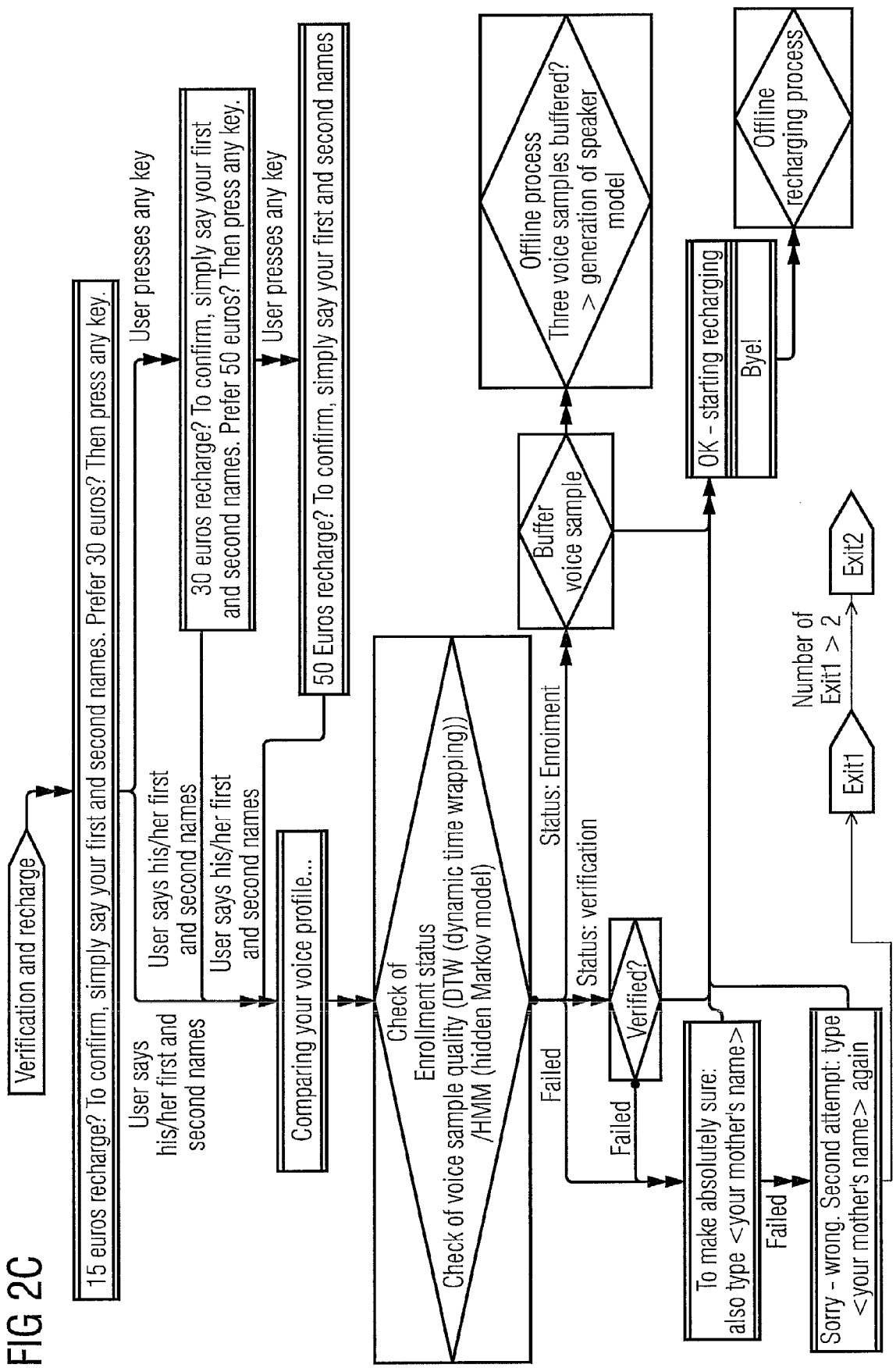
Figure 2D:
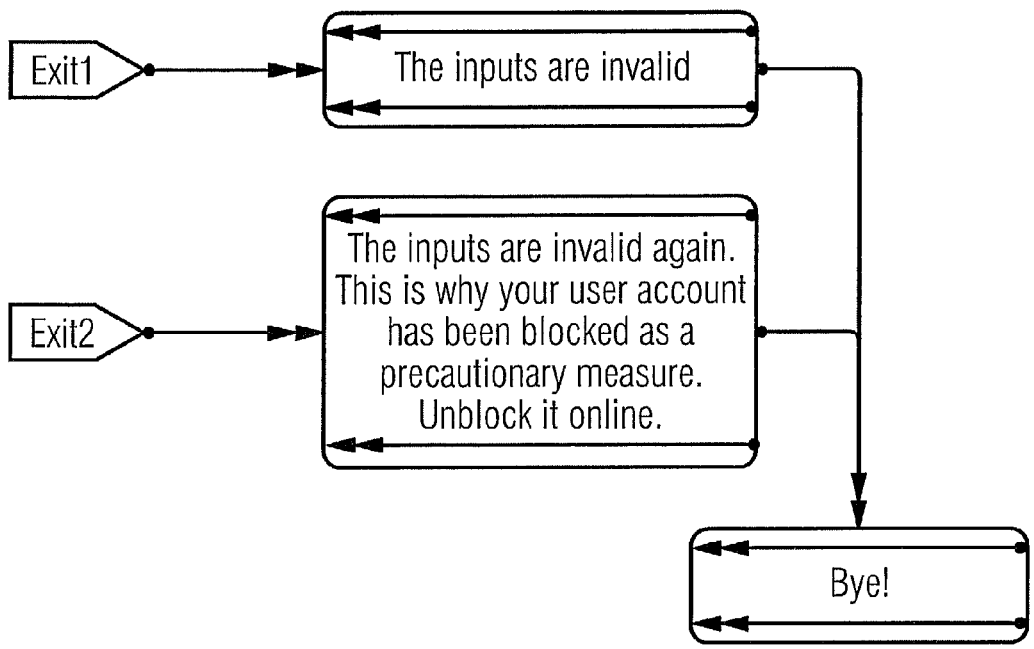

FIGS. 2B to 2D show some user prompting outputs which, of course, will be modified or may even be omitted in the event of a difference in the process (for example, without the option of selecting different recharging amounts).

FIGS. 2B and 2C show two variants of a call, wherein in the first variant (FIG. 2B) still no stored voice profile of the user is available and enrolment is intended, whereas in the second variant (FIG. 2C) verification (authentication) on the basis of a a previously stored voice profile is intended. However, as can be seen from the diagram in FIG. 2C in detail, here also steps are intended in the event that a prior enrolment was not successful. In comparison with the call variants, here also it becomes apparent that the additional use of a password (here: mother's name) is provided for the purpose of substitute authentication in various phases.

Figure 2E:
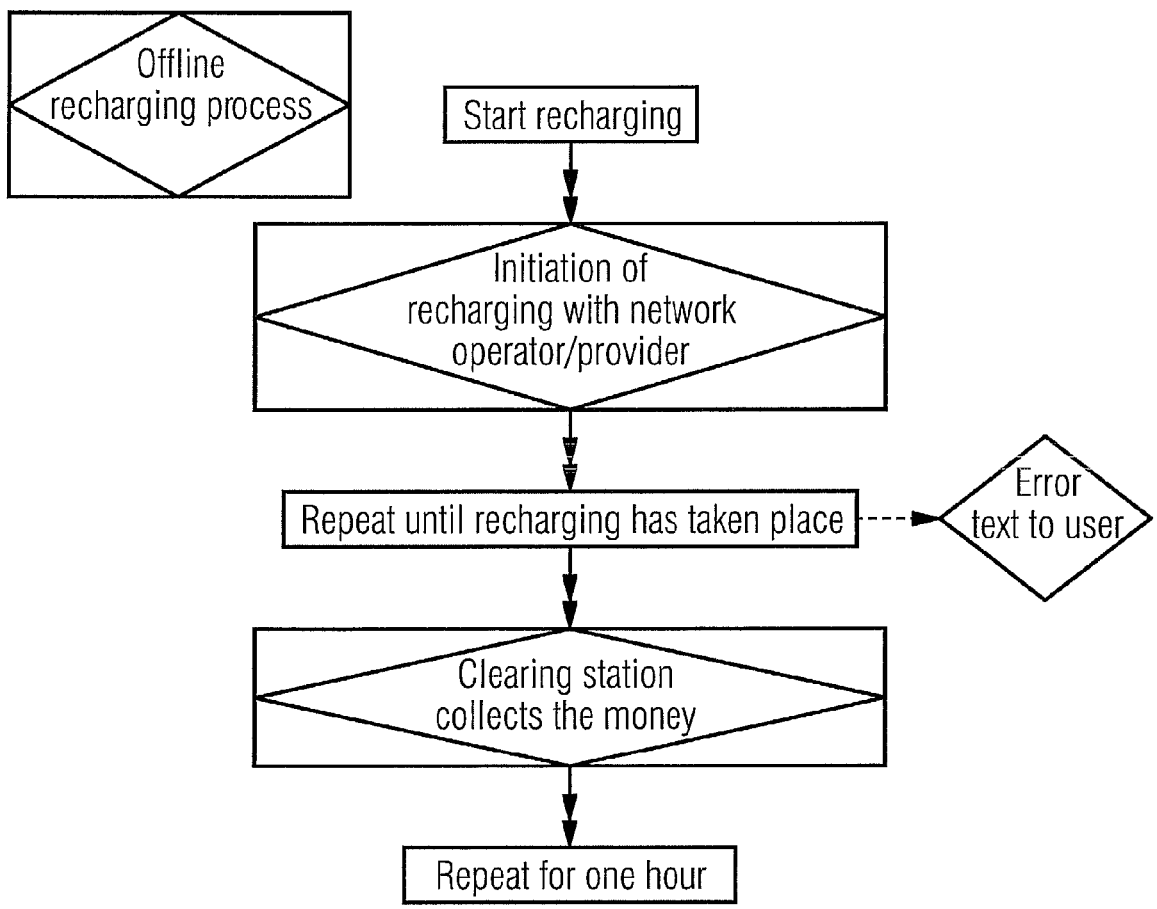

The sketch-like presentation of the offline charging procedure in FIG. 2E is to be understood as an additional presentation because it is independent of the authentication process.

FIG. 3 shows a variant of the arrangement shown in FIG. 1 which differs from it by a different kind of inputs and the signal processing within the frame of the substitute authentication procedure. However, the structure of the arrangement 1' as shown in FIG. 3 is largely identical with that of the arrangement shown in FIG. 1; the identical components are designated with the same reference numbers and are not explained once again here.

The essential difference consists of the fact that, here, voice inputs are used exclusively for voice profile-based authentication of the user and can therefore be routed directly (along signal path b) to the voice profile computation unit 25. Along the signal path a, both records generated automatically by the mobile telephone 3 (for example the MSISDN) and also records from inputs made by the user on the telephone keypad (for example, a PIN or a password, etc.) arrive at digital input classification stage 20. This stage 20 routes records generated automatically in the telephone along a first partial signal path a1 to the mobile number recognition stage 15, while data entered digitally by the user is routed over a second partial signal path a2 directly to the user data processing stage 19 and in parallel to the user input switch-through stage 35. The processing taking place in these components again corresponds to the processing in the first embodiment.

Realisation of the invention is not limited to the example arrangement presented and described above and the example process described above, but is also possible in a large number of variants that that lie within the scope of ordinary skill in the art. The general description part refers to essential other applications and modifications.

The invention claimed is:

1. A method for authenticating a user of a telecommunications or data network and adding to prepaid credit for a telephone, comprising steps of;
   (a) communicating with the server by a user from a prepaid mobile phone, the communication providing a live voice sample for access to protected data or a financial transaction service reserved for a defined circle of users or for the use of data currently entered by the user;
   (b) routing the voice sample to a voice analysis unit which computes and generates a current voice profile for the sample;
   (c) receiving the routed voice sample at a voice comparison unit and comparing it for a positive match to stored voice profiles for users;
   (d) authenticating the user of the mobile phone for access to a service and stored transaction data as a result of a positive match in step (c);
   (e) generating a control signal at the voice analysis unit for enabling access to the user;
   (f) receiving the control signal at the authentication server and allowing access to stored transaction data for initiating a financial transaction for the user including at least data required for a payment transaction to at least fill up credit for the prepaid mobile phone; and
   (g) triggering and controlling adding credit to the prepaid mobile phone as a result of steps (d), (e) and (f);
   wherein, at an input end of the voice analysis unit channel-adapted digital voice sample pre-processing is executed to eliminate impressed voice profile interference in the transmission channel between the prepaid mobile phone and a voice sample input interface.

2. The method of claim 1, wherein the authentication processed on the authentication server sends the first or second control signal to a separate data management server over a protected control signal connection to allow access to the user.

3. The method of claim 1, wherein filter parameters are used during voice sample pre-processing that have been determined in advance from channel codec parameters of the network standard used by the mobile phone.

4. The method of claim 1, wherein, in the event the user is not authenticated in step (d), further comprising a step generating a second control signal disabling access and generating a substitute authentication procedure comprising entry of a PIN or code word and comparison with a previously stored PIN or code word.

5. The method of claim 4, wherein during a first access attempt by the user of the mobile phone, the first control signal is generated in a response to entry of the PIN or the code word, and enunciation of a first voice sample.

6. The method of claim 5, wherein during the first access attempt, the first control signal is generated as a response to entry of the PIN or the code word, and storage of the current voice profile evaluated from a first enunciated voice sample is generated.

7. The method of claim 1, wherein a step is inserted for prompting a user to enunciate a voice sample or enter a PIN or code word, the prompt displayed or spoken to the user via the prepaid mobile phone.

8. A system server having software executing from memory providing a process for authenticating a user of a telecommunications or data network and adding credit to a prepaid mobile phone, comprising;
   a prepaid mobile phone communicating a voice sample spoken by a user to the server over the network;
   a voice analysis unit receiving the voice sample at an input interface from the prepaid mobile phone, the voice sample routed by the server and generating a current voice profile from the sample; and
   a voice comparison unit for comparing the current voice profile with voice profiles previously stored in a voice profile storage unit for a match;
   wherein in response to a positive match, a first control signal is generated authenticating the user for access to stored transaction data for initiating a financial transaction for the user, including at least transaction data required for a payment transaction to fill up a prepaid add credit for the prepaid mobile phone;
   and wherein, at an input end of the voice analysis unit channel-adapted digital voice sample pre-processing is executed to eliminate impressed voice profile interference in the transmission channel between the prepaid mobile phone and a voice sample input interface.

9. The system server of claim 8, further comprising a user prompting unit for receiving visual and/or audible user prompting, in particular to request a voice sample or to request entry of a PIN or code word on the user's prepaid mobile phone.

10. The system server of claim 8, wherein the connection between the prepaid mobile phone and the server is a secure connection, during and/or directly after completion of the authentication procedure, allowing access to the user of stored protected data or documents with a control input of a data management server on which, or with a control input of a service server through which services reserved for a defined circle of users can be accessed or generated.

11. The system server of claim 8, wherein a data input interface is provided at the server for receipt of data entered by the user on the prepaid mobile phone, a data storage unit connected to the data input interface for at least temporary storage of the data received and a data forwarding control unit connected by control signal to the voice profile comparison unit for forwarding of stored data in response to output of the first control signal by the voice profile comparison unit.

12. The system server of claim 8 wherein, in the event the user is not authenticated, a second control signal is generated disabling access and generating a substitute authentication procedure comprising entry of a PIN or code word and comparison with a previously stored PIN or code word.

* * * * *